(12) United States Patent
Blaesing et al.

(10) Patent No.: US 10,061,063 B2
(45) Date of Patent: Aug. 28, 2018

(54) CAMERA ARRANGEMENT FOR A MOTOR VEHICLE

(71) Applicant: Leopold Kostal GmbH & Co. KG, Luedenscheid (DE)

(72) Inventors: Frank Blaesing, Werl (DE); Alf Burau, Dortmund (DE); Andreas Pirchner, Castrop-Rauxel (DE); Thomas Weber, Luedenscheid (DE); Gregor Boehne, Castrop-Rauxel (DE); Frank Hagen, Luedenscheid (DE); Claudia Weber, Monheim am Rhein (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 567 days.

(21) Appl. No.: 14/260,703

(22) Filed: Apr. 24, 2014

(65) Prior Publication Data

US 2014/0233118 A1    Aug. 21, 2014

Related U.S. Application Data

(63) Continuation-in-part of application No. PCT/EP2012/072116, filed on Nov. 8, 2012.

(30) Foreign Application Priority Data

Nov. 10, 2011 (DE) .......................... 10 2011 118 134

(51) Int. Cl.
| | | |
|---|---|---|
| *G02B 5/04* | (2006.01) | |
| *B60R 11/04* | (2006.01) | |
| *G02B 27/00* | (2006.01) | |
| *B60R 11/00* | (2006.01) | |

(52) U.S. Cl.
CPC ................ *G02B 5/04* (2013.01); *B60R 11/04* (2013.01); *G02B 27/0025* (2013.01); *B60R 2011/0026* (2013.01)

(58) Field of Classification Search
CPC .... G02B 26/005; G02B 26/02; G02B 26/023; G02B 26/00; G02B 26/001; G02B 26/004; G02B 26/007; G02B 26/0833; G02B 5/045; G02B 2207/115; G02B 27/14; G02B 5/04; G02B 7/02; G02B 7/021; G02B 13/001; G02B 1/06; G02B 3/14; G09G 3/348; G09G 2300/08; G09G 3/3466; G09G 2300/0473; G09G 2300/0426; G09G 2300/0469; G09G 3/3426; G09G 3/3433; G09G 2300/04; G09G 2300/0404; G09G 2300/0452; G09G 2300/0456; G09G 2300/0814; G09G 2300/0819; G02F 1/167; G02F 1/01; G02F 2001/1678; G02F 1/0102; G02F 1/0128; G02F 1/163; G02F 1/17; G02F 1/172; G02F 1/0121; G02F 1/1313; G02F 1/13306; G02F 1/133305; G02F 1/133377; G02F 1/1335; G02F 1/133504; G02F 1/133602; G01N 15/14; G01N 2011/008; G01N 21/3577; G01N 21/85; G01N 21/8507

See application file for complete search history.

(56) References Cited

U.S. PATENT DOCUMENTS

| | | | | |
|---|---|---|---|---|
| 4,787,711 | A | * | 11/1988 | Suzuki ............... G02B 27/0101 |
| | | | | 359/631 |
| 4,902,098 | A | | 2/1990 | Rollin et al. |
| 6,046,867 | A | * | 4/2000 | Rana .................... G02B 5/1876 |
| | | | | 359/831 |
| 7,095,567 | B2 | | 8/2006 | Troxell et al. |
| 7,322,755 | B2 | | 1/2008 | Neumann et al. |
| 7,619,826 | B2 | | 11/2009 | Watanabe et al. |
| 2006/0034002 | A1 | | 2/2006 | Troxell et al. |
| 2007/0041725 | A1 | | 2/2007 | Neumann et al. |
| 2008/0192358 | A1 | * | 8/2008 | Watanabe .......... G02B 27/0101 |
| | | | | 359/633 |
| 2011/0234942 | A1 | * | 9/2011 | Nakagome ........... G02B 5/0226 |
| | | | | 349/64 |
| 2012/0206601 | A1 | | 8/2012 | Seger et al. |
| 2013/0162827 | A1 | | 6/2013 | Eickhoff et al. |

FOREIGN PATENT DOCUMENTS

| | | | | |
|---|---|---|---|---|
| DE | 3880075 | T2 | 10/1993 | |
| DE | 10342837 | A1 * | 4/2005 | ............ B60R 11/04 |
| DE | 102004024735 | A1 | 12/2005 | |
| DE | 102008008878 | A1 | 8/2008 | |
| DE | 102008020954 | A1 | 10/2009 | |
| DE | 102009027512 | A1 | 1/2011 | |
| DE | 102011015056 | A1 | 10/2011 | |
| EP | 1627773 | A1 | 2/2006 | |
| WO | 2011003735 | A1 | 1/2011 | |
| WO | 2012098192 | A1 | 7/2012 | |

OTHER PUBLICATIONS

European Patent Office, International Search Report for the corresponding PCT/EP2012/072116 dated Jan. 28, 2013.

* cited by examiner

*Primary Examiner* — William Choi
*Assistant Examiner* — Sharrief Broome
(74) *Attorney, Agent, or Firm* — Brooks Kushman P.C.

(57) ABSTRACT

A camera arrangement for a vehicle includes a camera and a prism. The camera is arranged behind a windshield of the vehicle. The prism is positioned between the windshield and the camera and is coupled to the windshield by a coupling medium. The prism has a light entry surface facing the windshield and a light exit surface facing an optical imaging component of the camera. The light entry surface and/or the light exit surface is non-flat by which the prism at least partially compensates for refraction resulting from curvature of the windshield.

15 Claims, No Drawings

CAMERA ARRANGEMENT FOR A MOTOR VEHICLE

CROSS-REFERENCE TO RELATED APPLICATIONS

This application is a continuation-in-part of International Application No. PCT/EP2012/072116, published in German, with an International filing date of Nov. 8, 2012, which claims priority to DE 10 2011 118 134.6, filed Nov. 10, 2011; the disclosures of which are hereby incorporated in their entirety by reference herein.

TECHNICAL FIELD

The present invention relates to a camera arrangement having a camera and a prism in which the camera is arranged within a vehicle interior behind a vehicle windshield, the prism is positioned between the windshield and the camera, the prism is coupled to the windshield by a coupling medium, and the prism has a light entry surface oriented toward the windshield and a light exit surface oriented toward the camera.

BACKGROUND

DE 10 2004 024735 A1 (corresponding to U.S. Pat. No. 7,322,755, which is hereby incorporated by reference in its entirety) describes a camera arrangement having a camera and a prism in which the camera is arranged within a vehicle interior behind a vehicle windshield or other vehicle window (both referred to herein as "windshield" or "pane"), the prism is positioned between the windshield and the camera, the prism is coupled to the windshield by a coupling medium, and the prism has a light entry surface oriented toward the windshield and a light exit surface oriented toward the camera. In particular, the light exit surface of the prism is oriented toward a camera sensor and an objective lens of the camera.

DE 10 2004 024735 A1 describes advantages resulting from the use of prisms with so-called driver assistance cameras. Advantages include robustness of the optical path with respect to environmental effects and miniaturization of the coupling surface ("footprint") on the windshield required for a given field of view. In order to achieve the robustness and prevent light reflection as much as possible, it is advantageous to press the light entry surface of the prism (e.g., a plane parallel glass plate) directly against the windshield pane with a soft coupling medium. The index of refraction of the optical media is as similar as possible in this case. The abovementioned miniaturization of the footprint is achieved by the prism angle, i.e., the angle between the input and output coupling surfaces. In the special case where the prism angle is 0°, i.e., the input and output coupling surfaces are parallel to one another, footprint reduction does not occur, but it is still possible to achieve an optically robust path. In DE 10 2004 024735 A1, the concept of a prism specifically includes this special case (prism angle=0°).

The curvature of the windshield pane in most types of vehicles and the slanted entrance of the beam when viewing through the normally sharply slanted pane leads to a defocusing effect of the pane when no prism is coupled to the pane. The curvature of the outside of the pane produces a focusing of the light beam with a flat inner side of a pane. This effect is somewhat overcompensated due to the concave surface of the inside of the pane having a somewhat smaller radius of curvature, and the thickness of the pane.

However, when a prism is fitted with a coupling agent to the inside of a curved pane, the defocusing effect of a concave surface fails due to the applied coupling medium and the flat rear side of the prism. This means that the cambered windshield pane and the coupling medium included between the flat prism and the attached pane act together as a lens.

Since the effective radii of curvature of windshield panes are generally different in the horizontal and vertical directions, and furthermore since windshield panes are typically sloped, the lens effect can usually not be completely compensated for by modifying the focus of the camera's objective lens.

DE 10 2008 020 954 A1 describes treating the problem of geometric distortions for a camera arrangement, and describes the light exit surface of a prism being formed as a serrated pattern in cross section, having first and second serrated edges, wherein the first serrated edges run parallel to the flat light entrance surface of the prism. DE 10 2008 020 954 A1 describes the light exit surface being cambered with respect to the serrated structuring in order to produce a lens effect.

DE 10 2009 027 520 A1 (corresponding to U.S. Publication No. 2012/0206601) describes introducing an equalizing sheet that is shaped complementary to the windshield pane into the beam to compensate for distortions. However, geometric distortions compensated for by camera arrangements of the Background Art are not a problem in general. Since the geometric distortions are uniform, they can be eliminated by a computerized image evaluation. Such a computerized image evaluation no longer requires a particularly significant level of effort using the present advanced state of processor technology.

A larger problem, as already described, is that a defocusing lens effect can arise due to the curvature of the windshield pane. The defocusing effect also depends on position and direction. The defocusing is effect is relatively small, but becomes increasingly annoying since driver assistance cameras have high image resolutions. Defocusing causes fuzzy images, and is accompanied by information losses, which should be avoided insofar as possible.

As an overview, when a windshield pane acts as a prism, the pane distorts the external image. When the windshield pane acts as a lens, possibly in conjunction with a coupling path, it defocuses. The defocusing comes about through the curvature of the pane and the different angles of incidence of the light beams, which depend on the direction of viewing. In an example of a windshield pane tilted at 25° with respect to the roadway, horizontally incident light beams arrive at the pane with an angle of incidence of 65°. For a vertical viewing range of ±15°, the incident angle range thus lies between 50° and 80°. A different amount of defocusing occurs for large angles than for small ones, so that this effect cannot be compensated for by changing the placement or direction of the objective lens with respect to the camera sensor.

As described herein, camera arrangements in accordance with embodiments of the present invention relate to this defocusing effect, which is relatively greatly amplified by the coupling medium and the camera prism.

SUMMARY

An object of the present invention includes a camera arrangement in which the defocusing effect resulting from the curvature of a windshield pane has relatively minimal effect on the image recorded by the camera.

In carrying out at least one of the above and other objects, the present invention provides a camera arrangement for a vehicle. The arrangement includes a camera and a prism. The camera is arranged behind a windshield of the vehicle. The prism is positioned between the windshield and the camera and is coupled to the windshield by a coupling medium. The prism has a light entry surface facing the windshield and a light exit surface facing an optical imaging component of the camera. The light entry surface and/or the light exit surface is non-flat by which the prism at least partially compensates for refraction resulting from curvature of the windshield.

In embodiments, the light exit surface is non-flat and the light entry surface is flat; the light entry surface is non-flat and the light exit surface is flat; and the light entry surface and the light exit surface are both non-flat. In this latter embodiment, the light entry surface and the light exit surface may have different non-flat shapes.

In embodiments, the light entry surface and/or the light exit surface is non-flat by being curved, by having a spherical shape, by having a cylindrical shape, or by having an ellipsoidal shape.

In an embodiment, the shape of each of the light entry surface and/or the light exit surface that is non-flat corresponds to the shape of the windshield at a mounting position of the camera arrangement.

Embodiments of the present invention provide a camera arrangement having a camera and a prism. The camera is arranged behind the windshield of a vehicle. The prism is arranged between the windshield and the camera and is coupled via a coupling medium to the windshield. The prism has a light-incident or light entry surface (front surface) facing the windshield and a light exit (rear surface) surface facing a camera sensor and/or an objective lens of the camera. At least one of the front and rear prism surfaces is a non-flat (non-planar or curved) surface, through which the prism compensates at least in part for refraction resulting from the curvature of the windshield.

A prism in accordance with embodiments of the present invention includes at least one non-planar surface by which the prism partially compensates for the refraction resulting from the windshield curvature. As such, instead of a conventional prism having flat front and rear prism surfaces, at least one or both of the front and rear surfaces of a prism in accordance with embodiments of the present invention is (are) formed (i.e., curved, non-flat, or non-planar) so that the lens effect described above is compensated for as thoroughly as possible.

The above features and other features and advantages of the present invention are readily apparent from the following detailed description thereof.

DETAILED DESCRIPTION

Detailed embodiments of the present invention are disclosed herein; however, it is to be understood that the disclosed embodiments are merely exemplary of the present invention that may be embodied in various and alternative forms.

A camera arrangement for a vehicle in accordance with embodiments of the present invention includes a camera and a prism. The camera is arranged within the vehicle interior behind the vehicle windshield. The prism is positioned between the windshield and the camera. The prism is coupled to the windshield by a coupling medium. The prim has a light entry or light-incident surface (i.e., a front surface) oriented toward the windshield and a light exit surface (i.e., a rear surface) oriented toward the camera. U.S. Pat. No. 7,322,755, which is hereby incorporated by reference in its entirety, includes FIGS. 1-8 which illustrate such a camera arrangement. As shown in the FIGS. 1-8 each of the light entry and light exit surfaces is flat or planar.

In accordance with embodiments of the present invention, the light exit surface of the prism is more particularly oriented towards the camera such that the light exit prism surface faces a camera sensor and/or an objective lens of the camera, and at least one or both of the light entry prism surface and the light exit prism surface is non-flat (i.e., non-planar) (e.g., curved). As such, no portion of the at least one of the light entry and light exit surfaces is flat or planar. Put another way, the at least one of the light entry and light exit surfaces is entirely non-flat (or non-planar or curved). Refraction resulting from the curvature of the windshield is compensated at least in part through these non-flat prism surface(s).

The camera sensor and the objective lens of the camera each is an optical imaging component of the camera. The camera may have other such optical imaging components. Such optical imaging components are aimed towards the windshield and are aligned along an optical axis of the camera.

Various advantageous embodiments of a prism of a camera arrangement in accordance with the present invention are available. Such embodiments may be implemented individually or in combination with one another. In one embodiment, only the light exit prism surface facing the camera sensor and/or the objective lens of the camera has a compensating shape. That is, in this embodiment, only the rear prism surface is non-flat or curved. Additionally, in another embodiment, the light entry prism surface facing the windshield pane is non-flat or curved. In this case, the shaping of the light entry and light exit prism surfaces together compensate for the defocusing by the windshield.

Curvature of the light entry and/or the light exit surfaces of the prism can be formed spherically or cylindrically or as an ellipsoid. The type and amount of curvature at the light entry and light exit surfaces can thereby be different. For example, the light entry surface may be horizontally cylindrical whereas the light exit surface may be vertically cylindrical or vice versa.

In embodiments, the front light entry and/or rear light exit prism surfaces is a free-formed surface(s) that is the result of an optimized calculation. This procedure generally allows the best possible compensation for defocusing to be achieved.

In addition, in embodiments, the curvature of the front and/or rear prism surface(s) is calculated while taking into consideration the properties of the camera optics. This allows, for example, a partial compensation to be carried out by the camera objective lens and a residual compensation by the shape of the prism.

In embodiments, the previously described curvature of the prism surface represents a compromise for a set of different windshield shapes. In order to achieve optimal compensation for the defocusing of an individual vehicle windshield, it is necessary to match the shape of the prism precisely to the curvature of the specific windshield at the exact installation site provided for the camera arrangement. Such a precise matching requires accurate measurements of the properties of the windshield. In most cases, it may be sufficient to match the shape of the prism to the averaged properties of a windshield production series, and to accept smaller deviations caused by machining tolerances, which is often accompanied by significant cost savings. If necessary, then the properties of different types of windshield panes can be averaged.

In embodiments, the prism is made as a single piece, or as multiple pieces, for example, as an achromatic prism or a flat prism fitted with (front light entry and/or rear light exit) curved portion(s). The prism can advantageously be manufactured of glass or plastic.

The prism can be supplemented by a so-called DOE (Diffractive Optical Element). A DOE is a component having an optical lattice structure that diffracts light. Furthermore, the prism may have spectrally filtering properties based on its material properties or on one or a plurality of additionally applied surface coatings. In addition, the prism may have additional features like minimizing reflections, protection against condensation, scratch resistance, etc., produced by surface coatings or treatments.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A camera arrangement for a vehicle, the arrangement comprising:
   a camera arranged behind a windshield of a vehicle; and
   a prism positioned between the windshield and the camera and coupled to the windshield by a coupling medium, the prism having a light entry surface facing the windshield in which light rays originating from an exterior side of the windshield enter through the windshield and into the prism and a light exit surface facing an optical imaging component of the camera in which the light rays exit from the prism toward the optical imaging component of the camera;
   wherein the light exit surface is a non-flat, concave surface by which the prism at least partially compensates for refraction resulting from curvature of the windshield.

2. The arrangement of claim 1 wherein:
   the light entry surface is flat.

3. The arrangement of claim 1 wherein:
   the light entry surface is non-flat.

4. The arrangement of claim 3 wherein:
   the light entry surface and the light exit surface have different non-flat shapes.

5. The arrangement of claim 1 wherein:
   the light exit surface has a spherical shape.

6. The arrangement of claim 1 wherein:
   the light exit surface has a cylindrical shape.

7. The arrangement of claim 1 wherein:
   the light exit surface has an ellipsoidal shape.

8. The arrangement of claim 1 further comprising:
   a diffractive optical element (DOE) connected with the prism.

9. The arrangement of claim 1 wherein:
   the shape of the light exit surface corresponds to the shape of the windshield at a mounting position of the camera arrangement.

10. The arrangement of claim 1 wherein:
    the prism includes one or more prism pieces.

11. The arrangement of claim 1 wherein:
    the prism includes glass or plastic.

12. The arrangement of claim 1 wherein:
    the prism includes a surface coating.

13. A camera arrangement for a vehicle, the arrangement comprising:
    a camera arranged behind a windshield of a vehicle; and
    a prism positioned between the windshield and the camera and coupled to the windshield by a coupling medium, the prism having a light entry surface facing the windshield in which light rays originating from an exterior side of the windshield enter through the windshield and into the prism and a light exit surface facing an optical imaging component of the camera in which the light rays exit from the prism toward the optical imaging component of the camera;
    wherein the light entry surface is a non-planar, curved surface and the light exit surface is a non-planar, concave surface by which the prism at least partially compensates for refraction resulting from curvature of the windshield.

14. The arrangement of claim 13 wherein:
    the shape of the light entry surface and the shape of the light exit surface correspond to the shape of the windshield at a mounting position of the camera arrangement.

15. The arrangement of claim 13 wherein:
    the non-planar, curved surface of the light entry surface is a non-planar, concave surface.

* * * * *